Dec. 31, 1940.　　　E. C. MERSEREAU　　　2,227,315
HAND BRAKE MECHANISM
Filed April 12, 1939　　　2 Sheets-Sheet 1
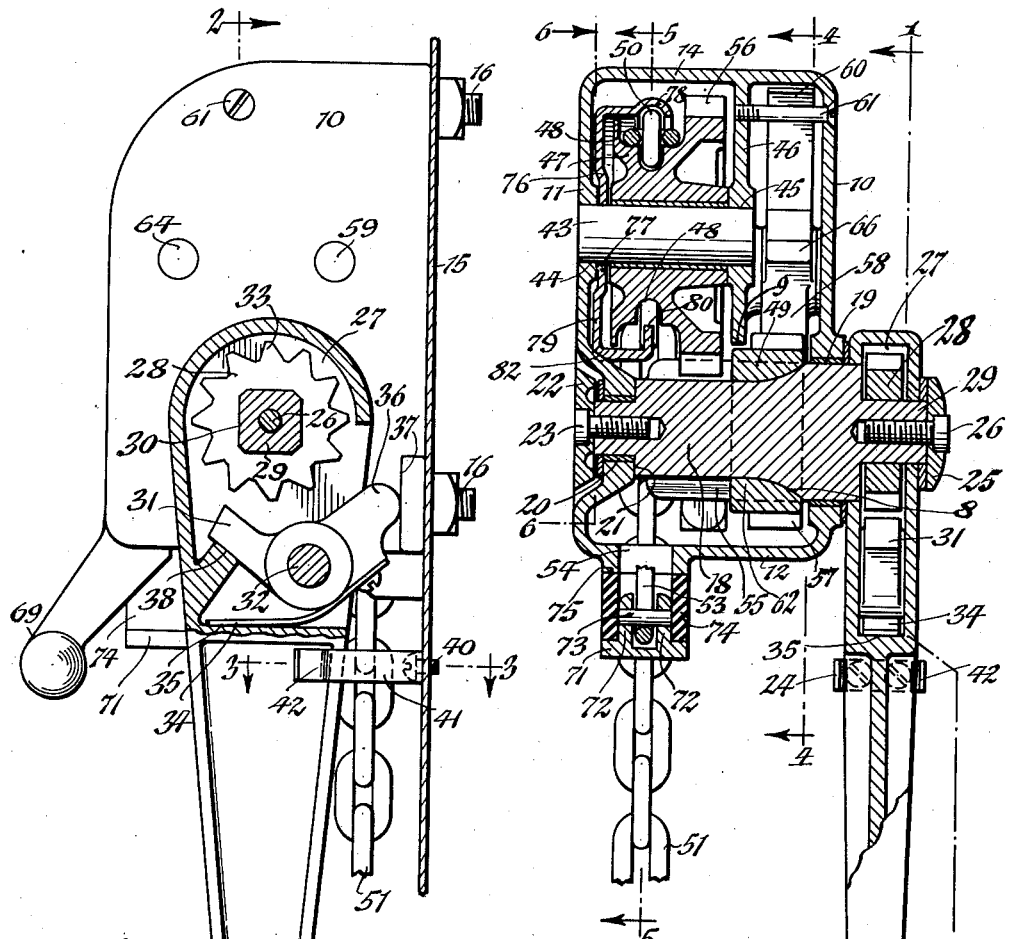
Fig.1.　　Fig.2.
Fig.3.
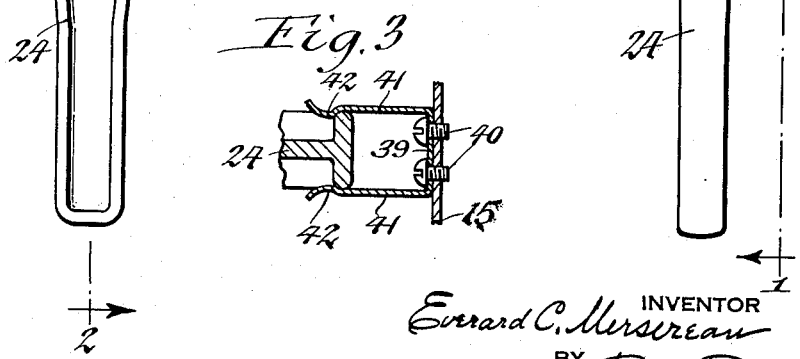
INVENTOR
Everard C. Mersereau
BY
ATTORNEYS Dec. 31, 1940.  E. C. MERSEREAU  2,227,315
HAND BRAKE MECHANISM
Filed April 12, 1939  2 Sheets-Sheet 2
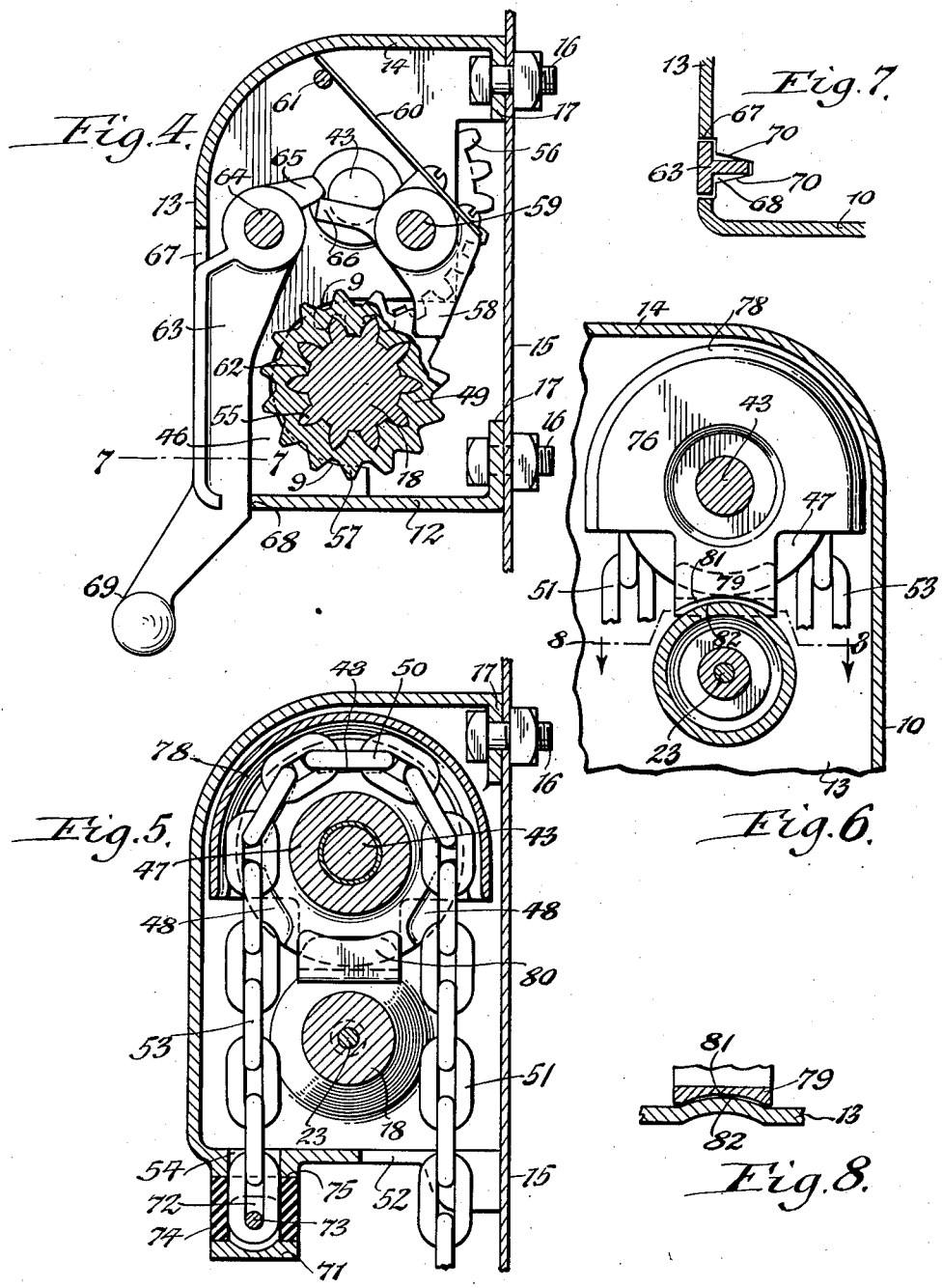
INVENTOR
Everard C. Mersereau
BY
ATTORNEYS Patented Dec. 31, 1940

2,227,315

UNITED STATES PATENT OFFICE 2,227,315

HAND BRAKE MECHANISM

Everard C. Mersereau, Buffalo, N. Y., assignor to National Brake Company, Inc., Buffalo, N. Y., a corporation of New York Application April 12, 1939, Serial No. 267,514

8 Claims. (Cl. 74—505)

This invention relates to a hand operating mechanism for the brake rigging of cars and more particularly railway cars which are used for the transportation of passengers and controlled by a motorman who performs the dual function of a conductor and brakeman.

One of the objects of this invention is to provide a hand brake mechanism of this character which is not only simple and durable in construction and reliable and efficient in operation, but which is very compact and therefore well suited for installation in the motorman's cab of railway cars where the space for accommodating the equipment is very limited.

Another object of this invention is to so organize this mechanism that the brakes can be set or applied quickly, readily and with a powerful effect so that the car can be stopped within a minimum distance when the circumstances require such action.

A further object of this invention is to provide means whereby any slack in the brake rigging may be quickly taken up regardless of the extent of this slack and thereby enable the brakes to be applied more quickly than has been possible heretofore and also to permit such slack to be taken up without producing any clicking noise or undue wear on the parts.

A still further object of this invention is to provide a guide for positively retaining the turn or bight of the brake chain on the chain drum so as to insure perfect cooperation between these parts at all times and also provide stripping means whereby the active and idle stretches of the brake chain are forcibly disengaged from the drum in the event that these parts should cling to each other, said guiding and stripping means being so mounted that they float relative to adjacent parts and are therefore capable of adapting themselves to the drum for controlling the brake chain without liability of these parts becoming jammed.

Additional objects of this invention are to provide cushioning or shock absorbing means in connection with the brake chain which will avoid a sudden jar and undue noise when paying out the brake chain and releasing the brake mechanism to its fullest extent, also to house the parts in such a manner that no undue projections exist on the exterior of the enclosing casing which might possibly interfere with the operation of the mechanism or impair its appearance, and also to improve the mechanism in minor details, as will presently appear.

In the accompanying drawings:

Fig. 1 is a side elevation of a hand brake mechanism partly in section, embodying this invention, the section being taken on line 1—1, Fig. 2.

Fig. 2 is a vertical section taken on line 2—2, Fig. 1.

Fig. 3 is a fragmentary horizontal section taken on line 3—3, Fig. 1.

Figs. 4, 5 and 6 are vertical sections taken on the correspondingly numbered lines in Fig. 2.

Fig. 7 is a fragmentary horizontal section taken on line 7—7, Fig. 4.

Fig. 8 is a fragmentary horizontal section taken on line 8—8, Fig. 6.

In the following description similar characters of reference indicate like parts in the several figures of the drawings:

The enclosing casing which houses the greater number of the movable members of this mechanism may be variously constructed but in its preferred form, as shown in Figs. 1, 2, 4, 5 and 6, the same comprises two longitudinal side walls 10, 11, a bottom wall 12 connecting the lower ends of the side walls, a front wall 13 connecting the front edges of the side and bottom walls and a top wall 14 connecting the upper edges of the side and front walls. The rear side of this casing is open when this brake operating mechanism is detached but closed by the wall 15 of the railway car when this operating mechanism is installed thereon. This connection between the casing and the car wall may be effected by various means but preferably by a plurality of bolts 16 passing through internal lugs 17 on the rear part of the casing and through the adjacent part of the car wall, as shown in Figs. 1, 2, 4 and 5.

Within the lower part of the casing is arranged a main operating or controlling shaft 18 which has its opposite ends extending through the side walls 10 and 11 of the casing and journaled in bearings 19 and 20 on said walls so that this shaft is capable of turning about a horizontal axis extending athwart the casing. Endwise movement of this shaft relative to the casing is prevented by means of an outwardly facing shoulder 21 formed thereon adjacent to the bearing 20 and engaging with the inner side of the adjacent side wall 11 of the casing and a thrust washer, plate or disk 22 secured to the respective end of this shaft by means of a screw 23 adapted to bear against the outer side of this casing wall, as shown in Fig. 2.

Means are provided whereby, upon turning this operating or controlling shaft forwardly, motion will be transmitted from this shaft to the brake rigging of the car for the purpose of applying or setting the brakes, which means are preferably constructed in the form of a hand operated ratchet device which may be disconnected from the shaft so as to permit the operating shaft to turn backwardly freely for releasing the brake mechanism when desired. The preferred form of this ratchet mechanism, as best shown in Figs. 1, 2 and 3, is constructed as follows:

The numeral 24 represents a hand lever which, in this particular organization, is pivotally mounted at its upper end on the right hand end of the operating shaft so as to be capable of turning thereon. This hand lever is held in its operative position on this shaft by engagement of its inner side with the adjacent wall 10 of the casing and a retaining washer 25 connected with the respective end of the operating shaft by means of a screw 26 and overhanging the adjacent outer side of this hand lever, as shown in Fig. 2. The hub of this hand lever, which surrounds the respective end of the operating shaft, is made hollow so as to provide a chamber or pocket 27 which encloses a ratchet wheel 28 mounted on the respective end of the operating shaft. This ratchet wheel and operating shaft are compelled to turn together by providing this end of the shaft with a reduced neck 29, the periphery 30 of which is of substantially square or rectangular form in cross section, as shown in Fig. 1, and engages with a correspondingly shaped opening in the center of the ratchet wheel 28, whereby these members are positively interlocked and compelled to turn in unison.

Within the lower part of the compartment or pocket 27 in the hand lever 24 is arranged a ratchet pawl 31 which is pivoted by means of a horizontal pin 32 on the adjacent part of this hand lever and adapted to engage with one or another of the teeth 33 on the periphery of the ratchet wheel 28 for turning the latter and the shaft connected therewith forwardly and also to be released from these teeth to permit this ratchet wheel and the shaft to turn backwardly independently of this hand lever. When free, this ratchet pawl 31 is yieldingly held in engagement with one or another of the teeth of the ratchet wheel 28 by means of a spring 34 connected at one end with its pawl and bearing at its opposite end against a shoulder 35 which is formed by the bottom of the pocket 27. This position of the ratchet pawl is assumed when the hand lever 24 is in a forward position. During the last part of the rearward movement of this hand lever the ratchet pawl 31 is automatically disengaged from the teeth of the ratchet wheel 28 by means of a throw-out or releasing tail 36 projecting rearwardly from the pawl 31 and adapted to engage a stationary abutment 37 formed on the outer side of the rear part of the adjacent wall 10 of the casing, as shown in Fig. 1. The extent which this ratchet pawl can be thrown out of engagement from the ratchet wheel 28 is limited by means of a stop 38 arranged on the handle 24 within the lower part of its compartment 27.

In the inoperative or idle position of the operating hand lever 24 the same hangs vertically in a pendant position from the operating shaft, which is also its rearmost position, as shown in Fig. 1. At this time the releasing tail 36 of the ratchet pawl 31 is in engagement with the abutment 37 so that this pawl is thrown out of engagement from the teeth 33 of the ratchet wheel and the spring 34 is placed under greater tension. When the parts are in this position the operating shaft 18 is free and the brake rigging operatively connected therewith is ready to be released for disengaging the shoes from the wheels of the car. If it is desired to apply the brakes, the operator grasps the lower end of the hand lever 24 and pulls the same forwardly whereby the releasing tail 36 is moved out of engagement from the abutment 37 and the spring 34 is permitted to turn the ratchet pawl 31 so that it engages the teeth of the ratchet wheel 28 and causes the operating shaft to be turned forwardly after effecting the initial part of its forward movement, thereby operating the brake rigging and applying the brakes. If any slack exists in the brake rigging after the hand lever 24 has been moved forwardly its fullest extent, the latter may be oscillated a sufficient number of times to take up this slack and thereafter apply the necessary pressure of the brake shoes against the wheels in order to stop or control the car. The backward stroke of the hand lever at this time is shortened so as to retain the ratchet pawl 31 in engagement with the ratchet wheel 28 and enable the same upon then moving this lever forwardly to promptly continue the tightening effect on the brake mechanism, but after the brakes have been applied the lever 24 is moved backwardly the fullest extent until it reaches its vertical inoperative position in which the ratchet pawl 31 is thrown out of engagement from the ratchet wheel 28 and thereby leave the brake mechanism in condition for being quickly released by means which operate wholly independently of this brake applying ratchet means, as will be hereinafter described.

For the purpose of retaining the hand lever in its rearmost position in which the ratchet pawl 31 is disengaged from the ratchet wheel 28 and preventing the spring 34 from moving this lever forwardly to any extent, retaining means are provided which operate to yieldingly hold this lever in its inoperative position. These retaining means, as shown in Figs. 1, 2 and 3, consist of a spring catch which is preferably made of a single piece of resilient metal so as to form a cross piece 39 which is secured by screws 40 to the car wall 15 and two spring arms 41 projecting forwardly from opposite ends of the cross piece 39 and having bevelled jaws 42 at their front ends which are adapted to engage over opposite edges of the operating handle 24 when the latter is moved into its rearmost position, as shown in Fig. 3. The tension of this spring catch is such that the same will hold this operating hand lever against vibration or displacement when the same is not used but will permit of readily moving this lever out of engagement from this catch when it is desired to set the brakes.

The mechanism whereby motion is transmitted from the operating shaft 18 to the brake rigging for applying the brake shoes is constructed as follows:

The numeral 43 represents a horizontal arbor or pivot pin arranged transversely in the upper part of the casing parallel with the operating shaft 18 and supported at its outer end in an opening 44 in the adjacent side wall 11 of the casing while its inner end is supported in an opening 45 formed in the lower part of a bracket or partition 46 which is arranged between the side walls and connected with the front, bottom and upper walls of the same. Upon this arbor or pin is rotatably mounted a chain drum 47 which is provided in its periphery with an annular row of pockets 48 which in effect form sprockets on this drum adapted to cooperate with the brake chain forming part of the hand operated mechanism leading to the brake rigging of the car. This chain has an upper turn or bight 50 which passes over the top of the drum and interlocks with the sprocket shaped periphery thereof and has an active stretch 51 extending from one end of this turn downwardly on one side of the drum through an opening 52 in the bottom of the casing to the brake rigging of the car and it also has an inactive or idle stretch 53 which passes from the other end of the turn of the chain on the opposite side of the drum downwardly through an opening 54 in the bottom of the casing.

Upon turning the drum forwardly a pull is produced by the active stretch 51 of the brake chain on the brake rigging so as to apply the brakes and that part of the chain which leaves the opposite side of the drum passes downwardly through the opening 54. Upon releasing the brakes the direction of the movement of the brake chain and drum is reversed and at this time the active stretch 51 of the chain passes downwardly through the bottom of the casing and the idle stretch 53 passes upwardly through the casing to the drum.

Rotary motion for operating the drum in the direction for winding the brake chain over the top of the same is derived from the operating shaft 18 by means of a driving gear pinion whose teeth 55 are formed integrally with the periphery of the inner part of the operating shaft 18 and mesh with the teeth 56 of a driven gear wheel which is preferably formed integrally with that side of the drum 47 next to the bracket 46, as best shown in Fig. 2. The gear pinion 55 and gear wheel 56 may be of any suitable ratio so that the power applied to the shaft by means of the hand operated ratchet mechanism will be multiplied when delivered to the brake rigging which operates the brake shoes. In Figs. 2 and 4 this ratio, for example, is about two turns of the gear pinion to one turn of the gear wheel.

Detent means are provided whereby the operating shaft and the drum geared thereto may be advanced step by step and held at the ends of every forward step in order to enable the ratchet mechanism to make an idle backward stroke preparatory to effecting the next following active stroke. As shown in Figs. 2 and 4, this detent mechanism comprises a detent wheel 49 mounted on the operating shaft 18 and provided with an annular row of detent teeth 57, a detent pawl 58 pivoted by means of a pin 59 on the side wall 10 and the internal bracket 46 of the casing and a spring 60 which yieldingly holds this detent pawl in engagement with the detent teeth 57 and is secured at one end to this pawl and bears at its opposite end against an abutment 61 consisting preferably of a screw arranged in the upper part of the casing and supported at its opposite ends on the side wall 10 and the bracket 46 of the casing.

As the operating shaft is turned forwardly, the detent pawl 58 trips idly over the teeth 57 of the detent wheel and at the end of the forward rotation of this operating shaft under the pressure in this direction of the ratchet mechanism, the hand lever 24 of this mechanism is free to move backwardly independently of the operating shaft due to the latter being held at this time by the detent pawl 58, thereby holding the brake mechanism in its applied position.

Various means may be employed for connecting the detent wheel 49 with the operating or controlling shaft 18 so that these members turn together but this is preferably accomplished in the manner best indicated in Figs. 2 and 4, by prolonging the teeth 55 of the gear pinion which are formed integrally with the operating shaft and interengaging the same with an annular row of internal teeth 62 formed in the bore of the detent wheel 49. By this means a very strong and durable connection is formed between this detent wheel and the operating shaft which positively connects the same and prevents them from becoming loose under the severest loads or vibrations to which they may be subjected. Moreover such a construction dispenses with the use of separate fastenings for this purpose which might possibly become detached and interfere with the operation of the apparatus.

In order to prevent the detent ratchet wheel 49 from sliding lengthwise in the event the same becomes loose on the shaft 18, stop means are provided which preferably consist of an outer stop shoulder 8 formed on this shaft and bearing against the outer side of the detent wheel 49, and an inner stop shoulder 9 formed on the inner edge of the partition 46 and overlapping the inner side of the teeth 57 around about one-half of the hub of this detent wheel, as shown in Figs. 2 and 4, thereby always maintaining this wheel in its operative position and preventing the same from interfering with the drum gear wheel.

Releasing means are provided whereby the detent pawl 58 may be manually disengaged from the teeth of the detent wheel 49 when it is desired to release the brakes, which means in their preferred form are constructed as follows and best shown in Figs. 1, 2, 4 and 7:

The numeral 63 represents the arms of a trip lever which extends through a slot in the casing from the interior to the exterior thereof and has its upper end pivotally mounted within the casing by means of a horizontal transverse pin 64 which is supported at its opposite ends on the wall 10 and the bracket 46 of the casing so that this trip lever swings in a vertical plane fore and aft of the casing while being operated. At its upper end this trip lever is provided with a short rearwardly projecting trip finger 65 which extends over a releasing lug or tail 66 projecting forwardly from the upper end of the detent pawl 58. In its inoperative position the trip lever is arranged in a pendant position and when operated the same is moved forwardly manually into an inclined position. The slot through which the trip lever extends from the interior to the exterior of the casing comprises a comparatively long upright upper portion 67 arranged in the front wall 13 of the casing and extending to the lower end thereof and a comparatively short lower horizontal part 68 formed in the bottom of the casing and extending rearwardly from the lower end of the long upper part 67 of this slot. When the trip lever is not in operation its arm is arranged vertically within the upper long part 67 and the lower short part 68 of the slot in the casing and has its front side flush with the front side of the casing, as shown in Figs. 1, 4, and 7, so that this part of the apparatus has a finished appearance and presents no obstructions which are liable to interfere with the free movement of the motorman while working in the vicinity of this brake operating mechanism. At its lower end the trip lever is provided with a handle 69 which is adapted to be grasped by the hand of the motorman or operator for actuating the trip lever. While the trip lever is in its pendant inoperative position, as shown in Fig. 4, its trip finger 65 is at the upper extremity of its movement and out of the path of the trip lug or tail 66 of the detent pawl 58, as shown in Fig. 4, so that the latter is free to rock back and forth as the teeth 57 of the detent wheel 49 trip past the same while being turned with the operating shaft during the operation of applying the brake mechanism, thereby avoiding any vibratory action of the trip lever at this time and the noise incident thereto, as would be the case if the finger 65 of the trip lever were arranged in the path of the detent trip lug at this time.

In order to utilize the arm 63 of the trip lever as a closure for the slot 67, 68 in the casing when this lever is not in use, the same is made of T-shape in cross section and the head of this T is brought in line with the portions of the front wall 13 on opposite sides of the long upper part of the slot 67, as shown in Fig. 7. To permit the arm of this trip lever to enter this slot when returning to its inoperative position without striking the casing on either side of the slot portion 67 and still avoiding the necessity of making an accurate fit of the parts, the two sides 70 of the short lower slot portion 67 in the casing converge rearwardly so that this slot portion is of tapering form and adatped to be engaged by the inner side of the arm of the trip lever as the latter is moved into its inoperative position, as shown in Fig. 7, and thereby centered relative to this slot in the casing.

Stop means are provided for the purpose of preventing the brake chain from being wholly detached from the chain drum when releasing the brakes and moving the brake chain backwardly its fullest extent, which stop means are combined with means for cushioning the chain when its movement is arrested after the maximum length of the same has been moved backwardly over the drum 47. These combined stop and cushioning means, as shown in Figs. 2 and 5, are constructed as follows:

The numeral 71 represents a stop disk extending across the outer end of the last link on the idle stretch 53 of the brake chain and attached to the same by means of two coupling lugs 72 projecting upwardly from this disk on opposite sides of said last link, and a pin 73 passing through said link and the lugs 72 of this stop disk. The numeral 74 represents a cushioning sleeve or tube of rubber or other resilient material which surrounds the coupling lugs 72 and the pin 73 and bears at its lower end against the upper side of the stop disk 71 while its upper end is adapted to bear against a shoulder or abutment 75 formed on the underside of the casing around the chain opening 54 therein, as shown in Figs. 2 and 5.

Upon moving the brake chain backwardly to its fullest extent during a brake releasing operation, the elastic sleeve 74, upon engaging the stop or abutment surface 75 of the casing, not only prevents the complete removal of the chain from the drum but also serves as an elastic bumper which absorbs the shock on the apparatus and eliminates the noise which otherwise would be produced. The stop disk 71 and rubber bumper also serve as a handle which may be grasped by the motorman or operator for quickly pulling back the brake chain and taking out the slack in the same and the parts connected therewith. This is possible due to the fact that when effecting such backward pull on the brake chain from the idle end thereof the pawls 58, 31 of the detent and ratchet mechanism are both deflected by the teeth of the detent wheel 49 and the ratchet wheel 28, thereby leaving the drum and the operating shaft geared thereto free to be turned backwardly as far as may be necessary to take out all of the brake chain.

In the preferred construction the stop device which also serves as a chain handle formed in the present case by the sleeve 74 and disk 71 is arranged below the casing and always exposed when engaging the stop 75 on the underside of the casing and also when moved downwardly away from the same more or less. This handle therefore serves the additional function of a visual indicator whereby the brakeman can tell by a glance at the chain handle whether the same is in engagement with the stop 75 and the brakes are fully released or whether this handle is out of engagement from this stop face 75 and the brake rigging not fully released, thereby aiding in preventing the brakes from dragging on the car wheels and wearing the same unduly as well as avoiding the expense involved in replacing worn shoes.

It is thus possible for the motorman to determine at all times to what extent the brake has been set or released. This capacity of the present brake operating mechanism is particularly useful when it becomes necessary to set or apply the brakes as quickly as possible in case of an emergency to avoid accidents or at least minimize the effect of the same.

When operating the brake mechanism very rapidly the brake chain is liable to jump off the chain drum 47 and the active and idle stretches of the same are also liable to become stuck on this drum instead of running freely on and off the same. In order to avoid such occurrence guarding means are provided which are preferably constructed as follows:

The numeral 76 represents a side plate, disk or head which is arranged between the drum 47 and the adjacent side wall 11 of the casing and provided with a large central opening 77 whereby the same is loosely mounted on the adjacent part of the arbor 43 so that this plate and the parts carried thereby can wobble to a limited extent on this shaft. On its upper part this supporting plate 76 is provided with a curved guide 78 which extends somewhat more than half way around the upper part of the chain drum 47 and the upper turn of the chain thereon and is substantially channel shaped in cross section so as to embrace this part of the chain, as shown in Figs. 2, 5 and 6. By this means the entire upper part of the drum and the corresponding part of the brake chain passing over the same are completely covered and guided one relatively to the other so that the same cannot become separated while the drum is turning and the chain is passing over the same either forwardly or backwardly, thereby preventing the chain from jumping out of the sprocket shaped pockets of the drum and climbing on the periphery thereof which otherwise would interfere with the proper operation of this part of the brake mechanism.

The numeral 79 represents an L-shaped stripper arm which projects downwardly from the lower part of the supporting plate 76 and thence inwardly underneath the adjacent part of the chain drum and is provided at its lower inner end with a finger shaped stripper 80 which projects upwardly into the lower part of the annular channel or groove of the chain drum between the active and idle stretches of the brake chain, as shown in Figs. 2 and 5. As the active stretch 51 of the brake chain leaves the descending side of the chain drum upon releasing the brake mechanism, this part of the chain engages with the stripper finger 80 and is forcibly disengaged thereby from the pockets of the chain drum in case the same becomes stuck thereto and whereby disengagement of these parts is assured and the brakes are permitted to release promptly when the detent mechanism is thrown out of engagement from the chain drum.

A similar effect of the stripping finger 80 is produced on the idle stretch of the brake chain in the event that this stretch becomes stuck in the pockets of the chain drum on the downwardly moving side of this drum while applying the brake mechanism, thereby insuring quick and effective application of the brake mechanism and proper control of the car.

These guiding means which serve to guide the brake chain in its movement over the chain drum and maintain the same in the proper working relation and the stripping means which compel the two stretches of the chain to separate from the chain drum during their respective downward movements therefrom are independent of the casing and free to float to a limited extent independently of this casing so that the guiding and stripping means of this guard device are always free to adapt themselves to the chain in its backward and forward movement over the drum. In order, however, to prevent this guide and stripper of the guard device from becoming displaced circumferentially to the drum and possibly interfering with the proper operation of this mechanism, this guard device is held against rotation about the axis of the drum by interengaging this guard device with the casing. This is preferably accomplished by providing the outer corner of the L-shaped stripper arm 79 with a recess 81 which is engaged by a projection 82 on the adjacent part of the casing, as shown in Figs. 2, 6 and 8. The fit between the cooperating surfaces 81 and 82 of this guard device and the casing is comparatively loose inasmuch as accuracy is not essential but should be sufficiently close so that the guard device cannot move circumferentially to an extent which would impair the guiding function of the channel shaped guide 78 and the stripping function of the finger 80.

As a whole this apparatus is of sturdy construction and has no delicate parts which are liable to get out of order. Moreover, most of the working parts are concealed so that interference with their operation is prevented and owing to the comparatively smooth exterior of the casing, the same presents a finished appearance.

Due to the various ways in which this apparatus can be operated, the same is very flexible and capable of being operated under various conditions which may be encountered in actual practice.

Moreover, the same is very compact in construction and capable of being installed where only a limited amount of space is available and also in different positions, as best suits other equipment on the car and also to render the same most convenient for operation by the motorman.

I claim as my invention:

1. A hand operating mechanism for the brake rigging of cars, comprising a controlling shaft operatively connected with said rigging, a ratchet wheel connected with said shaft and having an annular row of ratchet teeth, a forwardly and backwardly movable hand lever turning concentrically with said shaft, a ratchet pawl pivoted on said lever, a spring interposed between said lever and pawl and holding the latter yieldingly in engagement with said ratchet teeth, a throw-out tail arranged on said pawl and adapted during the last part of the backward movement of said lever to engage a stationary abutment and move said pawl out of engagement from said ratchet teeth, and retaining means for holding said lever yieldingly in its rearmost position when not in use consisting of a spring catch having a cross piece secured to a support and two spring arms projecting forwardly from opposite ends of said cross piece and receiving said lever between them and having bevelled jaws at their front ends which are engaged by opposite edges of said lever when moving the latter into its rearmost position.

2. A hand operating mechanism for the brake rigging of cars, comprising a controlling shaft, a hand lever having a ratchet connected with said shaft, means for transmitting motion from said shaft to said brake rigging including a flexible brake member connected at one end with said brake rigging while the other end of the same is free, a drum around which passes the bight end of said brake member, a gear wheel connected with said drum, a gear pinion formed integrally with said shaft and meshing with said gear wheel, and a detent device for holding said shaft at will against backward movement including a detent wheel having a hub provided internally with an annular row of coupling teeth which interengage with the teeth of said gear pinion and also provided externally with an annular row of detent teeth, and a detent pawl mounted on a stationary support and engaging with the external teeth of said detent wheel.

3. A hand operating mechanism for the brake rigging of cars, comprising a controlling shaft, a hand lever having a ratchet connected with said shaft, means for transmitting motion from said shaft to said brake rigging including a flexible brake member connected at one end with said brake rigging, a drum around which passes the other end of said brake member, a gear wheel connected with said drum, a gear pinion arranged on said shaft and meshing with said gear wheel, and a detent device for holding said shaft at will against backward movement including a detent wheel having a hub provided internally with an annular row of coupling teeth which interengage with the teeth of said gear pinion and also provided externally with an annular row of detent teeth, a detent pawl mounted on a stationary support and engaging with the external teeth of said detent wheel, and stop means for holding said detent wheel against longitudinal movement consisting of an outer stop shoulder arranged on said shaft and bearing against the outer side of said detent wheel and an inner stationary stop shoulder overlapping the inner side of the external teeth of said detent wheel.

4. A hand operating mechanism for the brake rigging of cars, comprising a casing having a slot consisting of a vertical upper part formed in the front wall of the casing and a horizontal lower part formed in the bottom thereof, a controlling shaft arranged transversely in the casing and journaled in the longitudinal walls thereof, a hand lever connected externally of the casing with the controlling shaft by a ratchet device, means operatively connecting said shaft with said brake rigging, a toothed detent wheel mounted on said shaft within the casing, a detent pawl pivoted within the casing and having a releasing tail, a spring for holding said detent pawl yieldingly in engagement with the teeth of said detent wheel, and a releasing lever pivoted within said casing and having an operating arm arranged normally in the upper and lower parts of said slot in the casing so as to produce a substantially even front side on said casing and having a releasing finger adapted to engage the tail of said detent pawl for disengaging the latter from the teeth of said detent wheel.

5. A hand operating mechanism for the brake rigging of cars, comprising a casing having a slot consisting of a vertical upper part formed in the front wall of the casing and a horizontal lower part formed in the bottom thereof, a controlling shaft arranged transversely in the casing and journaled in the longitudinal walls thereof, a hand lever connected externally of the casing with the controlling shaft by a ratchet device, means operatively connecting said shaft with said brake rigging, a toothed detent wheel mounted on said shaft within the casing, a detent pawl pivoted within the casing and having a releasing tail, a spring for holding said detent pawl yieldingly in engagement with the teeth of said detent wheel, a releasing lever pivoted within said casing and having an operating arm arranged normally in the upper and lower parts of said slot in the casing so as to produce a substantially even front side on said casing and having a releasing finger adapted to engage the tail of said detent pawl for disengaging the latter from the teeth of said detent wheel, and the inner end of the lower part of said slot being of backwardly tapering form and adapted to be engaged by the arm of said releasing lever during the last part of the backward movement of the same for guiding it into its normal position relative to the casing.

6. A hand operating mechanism for the brake rigging of cars, comprising a casing, a drum rotatably mounted in the casing, a brake chain passing over said drum and adapted to be connected with said brake rigging, and a guard separate from said casing and loosely mounted therein and having a guide extending over the entire upper part of said drum for confining said chain on the drum and preventing displacement thereof.

7. A hand operating mechanism for the brake rigging of cars, comprising a casing, a drum rotatably mounted in the casing, a brake chain passing over said drum and having an active stretch on one side of the drum and an idle stretch on the other side thereof, and a guard separate from said casing and loosely mounted therein and having an upper guide extending over the entire upper side of said drum for confining the upper turn of the chain thereon and a lower stripper arranged below the drum and between the stretches of said chain for forcibly removing the latter from the drum in case the chain clings to the same.

8. A hand operated mechanism for the brake rigging of cars, comprising a casing, an axle arranged on said casing, a drum rotatably mounted on said axle, a brake chain having an upper turn passing over said drum and having an active stretch arranged on one side of the drum and an idle stretch arranged on the opposite side of said drum, a guard having a side wall mounted loosely on said axle, an upper channel shaped guide extending over the top of the drum and the upper turn of said chain engaging therewith and a lower upwardly projecting stripper which is arranged between the stretches of the chain for disengaging the same from the underside of the drum and interlocking parts on said casing and guard for preventing the latter from rotating relative to the drum in either direction.

EVERARD C. MERSEREAU.